(12) United States Patent
Bathiche et al.

(10) Patent No.: US 9,648,309 B2
(45) Date of Patent: *May 9, 2017

(54) CONTROLLABLE LENTICULAR LENSLETS

(71) Applicant: Elwha LLC, Bellevue, WA (US)

(72) Inventors: Steven Bathiche, Kirkland, WA (US); Alistair K. Chan, Bainbridge Island, WA (US); William Gates, Medina, WA (US); Roderick A. Hyde, Redmond, WA (US); Edward K. Y. Jung, Bellevue, WA (US); Jordin T. Kare, San Jose, CA (US); Jaron Lanier, Sausalito, CA (US); John L. Manferdelli, San Francisco, CA (US); Clarence T. Tegreene, Mercer Island, WA (US); David B. Tuckerman, Lafayette, CA (US); Charles Whitmer, North Bend, WA (US); Lowell L. Wood, Jr., Bellevue, WA (US)

(73) Assignee: Elwha LLC, Bellevue, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/687,694

(22) Filed: Apr. 15, 2015

(65) Prior Publication Data
US 2015/0222886 A1    Aug. 6, 2015

Related U.S. Application Data

(63) Continuation of application No. 13/889,216, filed on May 7, 2013, now Pat. No. 9,013,564.

(51) Int. Cl.
*H04N 13/04*   (2006.01)
*G02B 27/22*   (2006.01)
*G09G 5/02*   (2006.01)

(52) U.S. Cl.
CPC ..... *H04N 13/0404* (2013.01); *G02B 27/2214* (2013.01); *G09G 5/02* (2013.01);
(Continued)

(58) Field of Classification Search
CPC .......... H04N 13/0404; H04N 13/0497; H04N 13/0409; H04N 13/0468; H04N 13/0402;
(Continued)

(56) References Cited

U.S. PATENT DOCUMENTS 6,175,448 B1 *   1/2001   Xie et al. ................. 359/484.05
6,710,920 B1     3/2004   Mashitani et al.
(Continued)

FOREIGN PATENT DOCUMENTS

JP   2013-068932   4/2013
KR   2006/0081112   7/2006

OTHER PUBLICATIONS

PCT International Search Report; International App. No. PCT/US2014/036533; Aug. 26, 2014; pp. 1-4.

*Primary Examiner* — Nathnael Aynalem
(74) *Attorney, Agent, or Firm* — Foley & Lardner LLP

(57) ABSTRACT

An autostereoscopic 3D display system includes a display having a plurality of pixels, wherein each pixel is configured to display light rays representing a left-eye view and a right-eye view of an image. The autostereoscopic 3D display system further includes an optical-deflection system configured to control the light rays representing the left-eye view and the right-eye view. The optical-deflection system includes a separately controllable lenslet associated with each pixel, where the lenslet is configured to steer the light ray representing the left-eye view corresponding to the pixel, and steer the light ray representing the right-eye view corresponding to the pixel.

34 Claims, 13 Drawing Sheets

(52) U.S. Cl.
CPC ....... *H04N 13/047* (2013.01); *H04N 13/0475* (2013.01); *H04N 13/0477* (2013.01); *H04N 13/0409* (2013.01); *H04N 2013/0465* (2013.01)

(58) Field of Classification Search
CPC ........... H04N 13/0418; H04N 13/0059; H04N 13/0477; H04N 13/0203; H04N 13/021; H04N 13/047; H04N 13/0475; H04N 13/0481; H04N 13/0278; G02B 26/005; G02B 27/0093; G02B 27/225
USPC .............. 359/242, 462, 466; 348/51, 53, 59; 382/154, 285; 349/15; 353/8
See application file for complete search history.

(56) References Cited

U.S. PATENT DOCUMENTS

| | | | |
|---|---|---|---|
| 7,688,509 B2* | 3/2010 | Vissenberg et al. | 359/463 |
| 7,722,189 B2 | 5/2010 | Miles | |
| 2002/0113867 A1* | 8/2002 | Takigawa | G02B 27/2228 348/51 |
| 2003/0128175 A1* | 7/2003 | Berstis | H04N 13/0427 345/84 |
| 2004/0057016 A1* | 3/2004 | Jones | H04N 13/0404 353/7 |
| 2006/0158729 A1 | 7/2006 | Vissenberg et al. | |
| 2006/0268240 A1 | 11/2006 | Miles | |
| 2007/0008620 A1* | 1/2007 | Shestak | G02B 3/14 359/463 |
| 2008/0036853 A1* | 2/2008 | Shestak | H04N 13/0418 348/51 |
| 2009/0201363 A1* | 8/2009 | Grossmann | G02B 27/0093 348/59 |
| 2009/0315883 A1 | 12/2009 | King | |
| 2010/0002295 A1 | 1/2010 | Kimpe | |
| 2010/0027113 A1 | 2/2010 | Shin et al. | |
| 2010/0157026 A1 | 6/2010 | Reichelt | |
| 2010/0195190 A1 | 8/2010 | Ishioka et al. | |
| 2010/0259804 A1 | 10/2010 | Buschbeck et al. | |
| 2011/0090419 A1* | 4/2011 | Yokoyama | G02B 27/2214 349/57 |
| 2011/0096071 A1 | 4/2011 | Okamoto et al. | |
| 2011/0199469 A1* | 8/2011 | Gallagher | H04N 13/0285 348/60 |
| 2011/0261169 A1* | 10/2011 | Tin | 348/51 |
| 2013/0050787 A1* | 2/2013 | Han et al. | 359/10 |
| 2014/0062710 A1* | 3/2014 | Wu et al. | 340/686.1 |

* cited by examiner

CONTROLLABLE LENTICULAR LENSLETS

CROSS-REFERENCE TO RELATED APPLICATIONS

The present application is a continuation of U.S. patent application Ser. No. 13/889,216, entitled "CONTROLLABLE LENTICULAR LENSLETS," filed on May 7, 2013, which is currently co-pending and incorporated by reference in its entirety and for all purposes.

BACKGROUND 3D-display systems have existed in a variety of forms for many years. Generally, these systems convey a sense of depth by presenting slightly different views of a similar image to each of a viewer's eyes. Conventional systems have employed color filters (such as the red/cyan glasses), type of light-polarization, or polarization angles, and require filters placed near the eyes. More recently, displays have been developed that can present 3D images without requiring the use of such filters. These displays, for example, often employ lenticular lenses or parallax barriers, etc. Such display systems are known as autostereoscopic displays.

SUMMARY

One exemplary embodiment relates to an autostereoscopic 3D display system including a display comprising a plurality of pixels, where each pixel is configured to display light rays representing a left-eye view and a right-eye view of an image. The autostereoscopic 3D display system further includes an optical-deflection system configured to control the light rays representing the left-eye view and the right-eye view, where the optical-deflection system includes a separately controllable lenslet associated with each pixel. The lenslet is configured to steer the light ray representing the left-eye view corresponding to the pixel, and steer the light ray representing the right-eye view corresponding to the pixel.

Another exemplary embodiment relates to a method for displaying 3D images. The method includes displaying, using a plurality of pixels, light rays representing a left-eye view and a right-eye view of an image, and controlling the light rays representing the left-eye view and the right-eye view by using at least one separately controllable lenslet per pixel. The lenslet is configured to steer the light ray representing the left-eye view corresponding to the pixel, and steer the light ray representing the right-eye view corresponding to the pixel.

Another exemplary embodiment relates to a non-transitory computer-readable medium having instructions stored thereon for execution by a processing circuit. The instructions include instructions for controlling a plurality of pixels configured to display light rays representing a left-eye view and a right-eye view of an image, and instructions for controlling at least one separately controllable lenslet per pixel. The lenslet is configured to steer the light ray representing the left-eye view corresponding to the pixel, and steer the light ray representing the right-eye view corresponding to the pixel.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
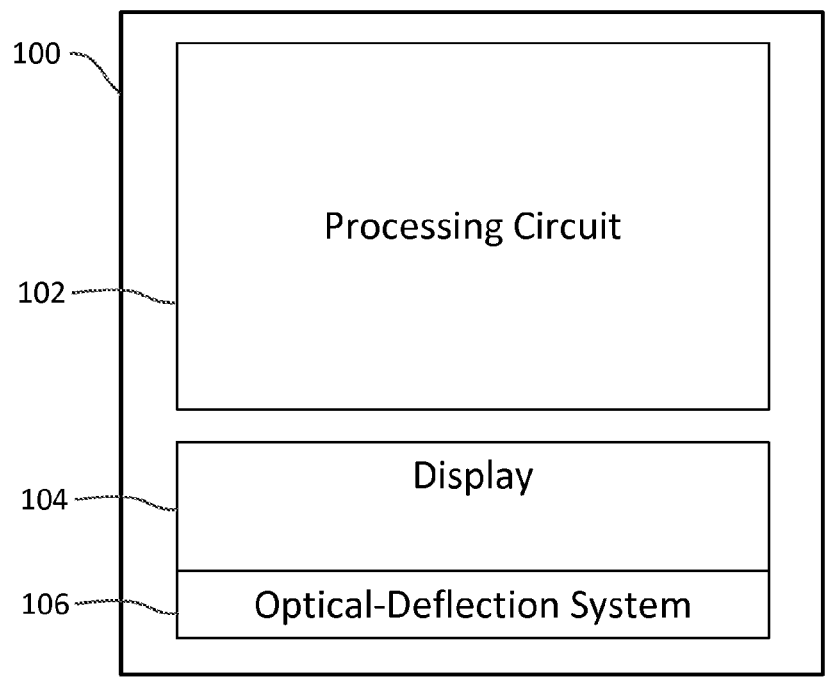
FIG. 1 is a block diagram of an autostereoscopic display including an optical-deflection system according to an exemplary embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Referring generally to the figures, various embodiments for controllable lenticular lenslets are shown and described. To display 3D images, an autostereoscopic display system may present a left-eye view and a right-eye view of an image and, while displaying each view, direct light rays corresponding to the views towards the left or right eye, respectively. For example, the system may track the position of a viewer's left eye and, when the system displays the left-eye view, direct light towards the tracked position of the left eye. Likewise, the system may track the position of the viewer's right eye and, when the system displays the right-eye view, direct light towards the tracked position of the right eye. In this way, the system may display the left-eye view to the viewer's left eye and the right-eye view to the viewer's right eye. As another example, the system may direct the left-eye view and right-eye view to a determined viewing location. By using images that are offset in a way that mimics the real-life offset associated with viewing the same scene from the perspective of each eye, the display system may help to give the appearance of depth to a displayed image.

Utilizing electrically controllable lenslets, the optical-deflection system of a display may control the beams representing the left-eye and right-eye views. Some embodiments may be configured with one lenslet per pixel of the display, while other embodiments may use multiple lenslets per pixel. In an exemplary embodiment, the electrically controllable lenslets utilize electro-refractive materials. Such lenslets may include electro-refractive lenses, electro-refractive prisms, evanescent-based electro-optic components, and electro-refractive components formed using electrowetting techniques, etc. The refractive index of the electro-refractive materials may be electrically adjusted, thereby actively steering light beams passing therethrough by a controlled amount. In another embodiment, the electrically controllable lenslets utilize surface acoustic waves to steer the light beams. In this arrangement, surface acoustic waves are generated to control the diffraction of light beams passing therethrough. A sweet-spot, or ideal viewing location, may be defined and adjusted laterally or in range by controlling the angular deflection of left-eye and right-eye beams. Controllable lenslets may be used separately or in conjunction with other fixed stereoscopic components (e.g., components that are primarily responsible for splitting a source beam into left-eye and right-eye view beams, etc.).

Referring to FIG. 1, a block diagram of autostereoscopic display system 100 for executing the systems and methods of the present disclosure is shown. According to an exemplary embodiment, autostereoscopic display system 100 includes processing circuit 102, display 104, and optical-deflection system 106. Each of component 102, 104, and 106 may be coupled to a system bus to facilitate communications therebetween. Some embodiments may not include all the elements shown in FIG. 1 and/or may include additional elements not shown in the example system of FIG. 1. Display 104 includes one or more light sources and a variety of other optical features for presenting images. Light sources may include, for example, light emitting diodes, liquid crystal component, electroluminescent components, incandescent light sources, gas discharge sources, lasers, electron emission sources, and/or quantum dot sources, among other existing and future light-source technologies. In an example display screen, sets of light sources may be organized into arrays and other such groupings in order to form complex images or patterns. In such an arrangement, each light source may behave as an individual illuminated location (e.g., a pixel) on a larger display screen. In other arrangements, single light sources may illuminate several pixels. Light sources may also include components necessary to split a single beam into multiple beams of light (e.g., lenticular barriers, lenticular arrays, parallax barriers, lenses, prisms, mirrors, beam-splitters, liquid crystals, electronic ink, baffles, filters, polarizers, and/or waveguides, etc.). In an exemplary embodiment, display 104 is the liquid crystal display of a 3D television. In another embodiment, display 104 is the LED display of a computer monitor system.

Display 104 includes optical-deflection system 106. Optical-deflection system 106 includes controllable lenslets as further described herein. Optical-deflection system 106 is responsible for controlling the angular direction of light produced by light sources of display 104. Optical-deflection system 106 may include any of several types of optical deflectors and may be controlled and implemented in a variety of ways. The optical deflectors discussed herein utilize controllable lenslets to direct beams of light to a viewer or viewing location. Optical-deflection system 106 may include mechanical, electro-optical, and acousto-optical components.

Controllable lenslets may include mechanical deflectors that are typically passive optical components, such as, lenses, waveguides, mirrors, and/or beamsplitters, etc. When used with a fixed light source, such passive optical elements will typically deflect light from the fixed light source in the same way each time they are used. Mechanical deflectors may be used in conjunction with controllable lenslets as described herein. In this manner, light beams passing through a mechanical beam splitter may be split into multiple beams (e.g. a left-eye beam, and a right-eye beam, etc.), and then steered by electronically controllable lenslets. This allows both the left-eye beam and right-eye beam to be controlled and steered separately or at the same time.

Controllable lenslets may include electro-optical deflectors that controllably deflect light by passing light through specialized materials that are optically reactive to electrical signals. For instance, some crystals and polar liquids change refractive index in response to an applied electric field. In particular, those materials that exhibit the Kerr electro-optic effect change refractive index in proportion to the square of the strength of an applied electric field. Materials that exhibit the Pockels electro-optic effect change refractive index linearly with the strength of an applied electric field. Hence, optical-deflection system 106 may send light through controllable lenslets containing deflectors that exhibit either effect and thereby control the light's angle of deflection by manipulating the electric field that it applies across the material. Other electro-optical and magneto-optical effects may be used in such lenslets. As discussed with respect to mechanical passive deflectors, light beams for a single pixel may be split into multiple beams (e.g. a left-eye beam, and a right-eye beam, etc.), and then steered by the controllable electro-optical deflectors of the lenslets. This allows both the left-eye beam and right-eye beam to be controlled and steered at the same time.

Controllable lenslets may include acousto-optical deflectors that use acoustic (e.g., sound) waves in an optical medium to control how light will propagate (and deflect) while passing through the medium. In particular, when a standing acoustic wave is generated in a material, the periodic nature of the wave produces a pattern of alternating regions of more dense and less dense material. This alternating pattern of density causes a corresponding alternating pattern of refractive index through the material, which, in turn, causes light passing through the material to diffract, undergoing partial scattering at the multiple evenly spaced planes defined by the alternating densities setup by the standing acoustic wave. Due to this periodic scattering, only light traveling in certain directions will constructively interfere and pass through the material, meaning that light will emerge from such a deflector only at certain angles. The allowed angles of emergence from such a deflector depend, among other things, on the frequency of the acoustic wave, i.e., the spacing between its waves. Therefore, acousto-optical deflectors may enable deflection system 106 to change the deflection angle (i.e., the angle of emergence) of light passing through the deflector selectively, by changing the frequency of the acoustic wave. As discussed with respect to mechanical passive deflectors, light beams for a single pixel may be split into multiple beams (e.g. a left-eye beam, and a right-eye beam, etc.), and then steered by the acousto-optical deflectors of the controllable lenslets. This allows both the left-eye beam and right-eye beam to be controlled and steered at the same time.

In some systems, acousto-optical deflectors may generate acoustic waves through only a thin layer at the surface of an optical element. Such a wave, called a surface acoustic wave (SAW), may produce a similar optical effect as bulk acoustic waves (i.e., acoustic waves through the bulk of the material). To create a SAW, systems may send electrical signals to piezoelectric or other electro-mechanical transducers organized at the surface of an optical material. For instance, comb-shaped transducers may be organized in an interdigitated pattern so that alternating signals at the transducers may yield standing waves at the surface of the material. Other techniques may also be used.

Autostereoscopic display system 100 further includes processing circuit 102. Processing circuit 102 contains components necessary for controlling optical-deflection system 106 of display 104. Processing circuit 102 generates signals necessary to adjust the controllable lenslets of optical-deflection system 106. In one embodiment, processing circuit 102 receives input related to a desired/ideal viewing location, or a sweet-spot. In another embodiment, processing circuit 102 generates an ideal viewing location. Processing circuit 102 causes controllable lenslets to adjust the deflection angles of left-eye and right-eye beams produced by pixels, and thereby adjusts viewing locations. Viewing locations may be adjusted lateral or in range. In one embodiment, autostereoscopic display system 100 includes components for generating an identifier to assist a viewer in finding the ideal viewing location. For example, this may include projecting a light beam aimed at the ideal viewing location, or displaying the range/angle information of the ideal viewing location on the display (e.g. via the graphical user interface) of autostereoscopic display system 100.

Figure 2:
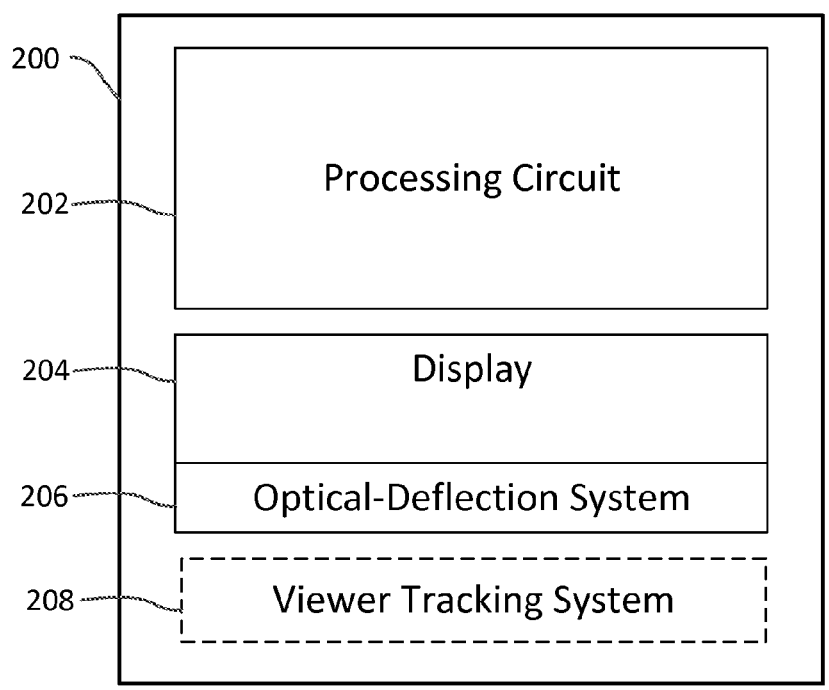
FIG. 2 is a block diagram of an autostereoscopic display including an optical-deflection system according to an exemplary embodiment.

Referring to FIG. 2, a block diagram of autostereoscopic display system 200 for executing the systems and methods of the present disclosure is shown. According to an exemplary embodiment, autostereoscopic display system 200 includes processing circuit 202, display 204, optical-deflection system 206, and viewer tracking system 208. Processing circuit 202, display 204, and optical-deflection system 206 may be configured as described above with respect to FIG. 1 (e.g., processing circuit 102, display 104, and optical-deflection system 106, etc.). Some embodiments may not include all the elements shown in FIG. 2 and/or may include additional elements not shown in the example system of FIG. 2. Viewer tracking system 208 is generally configured to track the location of a viewer of display 204. Viewer-tracking system 208 provides viewer location information to processing circuit 202, which may adjust optical-deflection system 206 such that left-eye and right-eye beams are aimed at a viewer's left and right eyes, respectively. Viewer tracking may be implemented in a variety of ways. In one embodiment, viewer tracking system 208 uses eye-tracking mechanisms. Eye-tracking components may be integral in the same device as display 204 or may be a separate device. In other cases, eye-tracking components may communicate with other elements of the system (e.g., processing circuit 202). In some cases, viewer tracking system 208 may control itself and send eye-tracking and/or viewer location data to processing circuit 202. In other arrangements, viewer tracking system 208 may receive control signaling from a central controller in addition to sending viewer location data.

In an exemplary embodiment, viewer-tracking system 208 includes components used to generate viewer and eye-location data (i.e. data indicating the location of a viewer's eyes relative to the display 204 as opposed to gaze direction, which would indicate the direction the eyes are looking) in a variety of ways. As an example, such components may include cameras, infrared sensors, radar sensors, ultrasonic sensors, etc. A video-processing approach may involve capturing images in the direction that display 204 faces and analyzing the images to detect portions of the image that are representative of one or more eye locations. Another approach may use proximity sensors may determine eye-locations by sending optical or acoustic signals into an area, measuring signals that are reflected back towards the sensor, and processing the reflected signals to detect data indicative of at least one eye-position. In another arrangement, a user may wear or carry a device or other labeling element that viewer-tracking system 208 may detect and use as an indication of the position of the viewer's eyes. In a video processing, proximity sensing, or other detection techniques, sensors may determine eye-locations from data representing the actual eye, such as an image of the eye or optical/acoustic waves reflected from the eye. Additionally or alternatively, sensors may determine eye-locations from data representing other parts of the viewer's body. For example, in response to receiving data that is indicative of the position and orientation of a viewer's head or nose, the system may relate these head characteristics to a general template and thereby estimate the position of each of the user's eyes. It should be understood that the scope of the present disclosure is not limited to a particular method of viewer or eye tracking.

Figure 3:
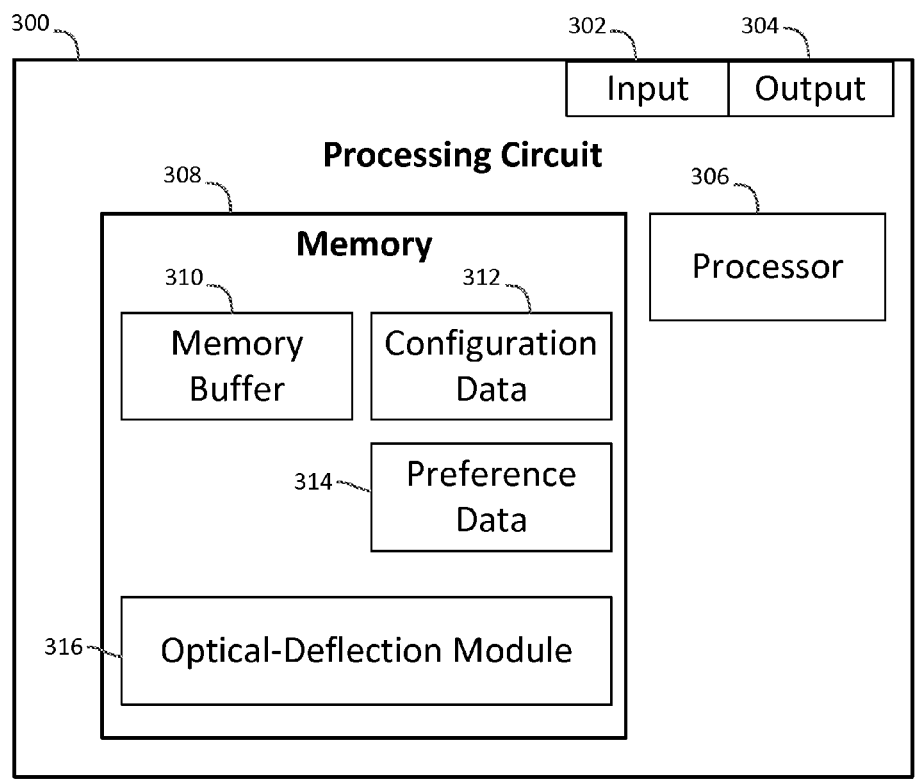
FIG. 3 is a detailed block diagram of a processing circuit according to an exemplary embodiment.

Referring to FIG. 3, a more detailed block diagram of processing circuit 300 for completing the systems and methods of the present disclosure is shown according to an exemplary embodiment. Processing circuit 300 may be processing circuit 102 of FIG. 1 or processing circuit 202 of FIG. 2, etc. Processing circuit 300 is generally configured to accept input from an outside source (e.g., a viewer tracking system, etc.). Processing circuit 300 is further configured to receive configuration and preference data. Input data may be accepted continuously or periodically. Processing circuit 300 uses the input data in adjusting the controllable lenslets of an optical-deflection system. Processing circuit 300 generates signals necessary to increase or decrease the angle of deflection of a left-eye beam and a right-eye beam. For example, processing circuit 300 may cause the controllable lenslet of a pixel to steer both the left-eye beam and right-eye beams of the pixel by the same angular amounts. In this manner, the lateral viewing location for that pixel may be adjusted. In another embodiment, processing circuit 300 causes the controllable lenslet of a pixel to steer both the left-eye beam and right-eye beams of the pixel by differing angular amounts. In this manner, the range (i.e. forward and backward distance) of the viewing location for that pixel may be adjusted. Processing circuit 300 may adjust both the lateral positioning and range of a viewing location of a pixel. Additionally, processing circuit 300 may control lenslets corresponding groups of pixels, thereby adjusting the overall viewing locations corresponding to the groups of pixels. In some embodiments, a certain group of pixels may be allocated to a particular viewer. In this arrangement, processing circuit 300 may adjust the lenslets corresponding the a group of pixels such that each viewer is provided a viewing location.

According to an exemplary embodiment, processing circuit 300 includes processor 306. Processor 306 may be implemented as a general-purpose processor, an application specific integrated circuit (ASIC), one or more field programmable gate arrays (FPGAs), a group of processing components, or other suitable electronic processing components. Processing circuit 300 also includes memory 308. Memory 308 is one or more devices (e.g., RAM, ROM, Flash Memory, hard disk storage, etc.) for storing data and/or computer code for facilitating the various processes described herein. Memory 308 may be or include non-transient volatile memory or non-volatile memory. Memory 308 may include database components, object code components, script components, or any other type of information structure for supporting the various activities and information structures described herein. Memory 308 may be communicably connected to the processor 306 and include computer code or instructions for controlling lenslets as described herein and for executing the processes described herein (e.g., the processes shown in FIGS. 9-11).

Memory 308 includes memory buffer 310. Memory buffer 310 is configured to receive data from a module of an autostereoscopic display unit (e.g. optical-deflection system 106, viewer tracking system 208, etc.) through input 302. For example, the data may include viewer information, eye-location information, ideal viewing location information, light detection information, sonic or ultrasonic information, thermal information, and camera information. The data received through input 302 may be stored in memory buffer 310 until memory buffer 310 is accessed for data by the various modules of memory 308. For example, optical deflection module 316 may access the data that is stored in memory buffer 310.

Memory 308 further includes configuration data 312 and preference data 314. Configuration data 312 includes data relating to processing circuit 300. For example, configuration data 312 may include information relating to interfacing with other components of an autostereoscopic display. This may include the command set needed to interface with display and light generation components, for example, an LCD display. As another example, configuration data 312 may include default information as to where a viewing location is positioned or how often input should be accepted from a view detection system. Configuration data 312 further includes data used to configure the communications between the various components of processing circuit 300. Preference data 314 may be used to store viewer related settings. In one embodiment, a viewer specifies her desired viewing location, including an angular offset and range, and such data is stored in preference data 314.

Optical deflection module 316 is configured to generate signals necessary to electronically control and adjust the lenslets of the optical-deflection system (e.g., optical-deflection system 106, optical-deflection system 206, etc.) of an autostereoscopic display. Optical deflection module 316 generally receives information relating to a viewing location and generates signals and commands necessary to cause controllable lenslets to steer light beams to the viewing location. As an example, viewing location information may be provided by configuration data 312, preference data 314, or a viewer tracking system.

In an exemplary embodiment, the viewing location information contains range data and eye-location data provided by a viewer tracking system. Range and eye-location data may be provided by the viewer tracking system in real time, according to a schedule, or on demand (e.g., in response to a user command, a calibration method, or other event, etc.). Range data may correspond to a viewer's distance, or the distance of a desired viewing location. Eye-location data may portray or represent various characteristics of detected eyes of a viewer. For example, eye-location data may represent the spatial position of the detected eyes in any coordinate system in one, two, or three dimensions. As another example, eye-location data may represent estimated future locations of the detected eyes. As a further example, eye-location data may represent the movement of the detected eyes. As still another example, eye-location data may represent specific characteristics of the detected eyes (e.g., right eye, left eye, first viewer, second viewer, specific viewer identity, etc.). Optical deflection module 316 analyzes the range and eye-location data and generates signals to electronically adjust the angular steering provided by the controllable lenslets of the optical-deflection system. Angular adjustments may correspond to the location of the particular lenslet (or group of lenslets) on the display. As an example, for a viewing location in line with the center of the display, a lenslet of a pixel located at the center of the display may angularly steer light less in comparison to a lenslet of a pixel located at the edge of the display.

In an exemplary embodiment, the viewing location information is provided by configuration data 312. The viewing location information includes default values for a viewing location or viewing locations. Such a location may include a defined distance and angle from the display. As an example, an ideal viewing location may be 12 feet from the center axis of the display. Optical-deflection module 316 receives these coordinates and adjusts the lenslets of the optical-deflection system accordingly. Adjustments may be made according to an adjustment algorithm. Such an adjustment algorithm is capable of receiving viewing location coordinates, and calculating the appropriate angular offsets required for a particular lenslet, or group of lenslets. Calculations may be made according to one, two, or three-dimensions, and utilize any coordinate system. Angular deflection adjustments required for a particular pixel may be defined with respect to the dimensions and specifications of the display. Accordingly, the adjustment algorithm may access configuration data 312 for information relating the geometry and specifications of the particular display. As an example, the information may include screen size, pixel density, lenslet density, etc.

In an exemplary embodiment, the viewing location information is provided by preference data 314. The viewing location information includes values for a viewing location as input by a viewer. For example, a viewer may use a graphical user interface (GUI) system of the autostereoscopic display to input a desired viewing location. Such a location may include a distance and angle from the display. As an example, the viewing location may be located 8 feet in distance from the display, and offset at a 5 degree angle from a center axis of the display. Optical-deflection module 316 receives these coordinates and adjusts the lenslets of the optical-deflection system accordingly.

Figure 4A:
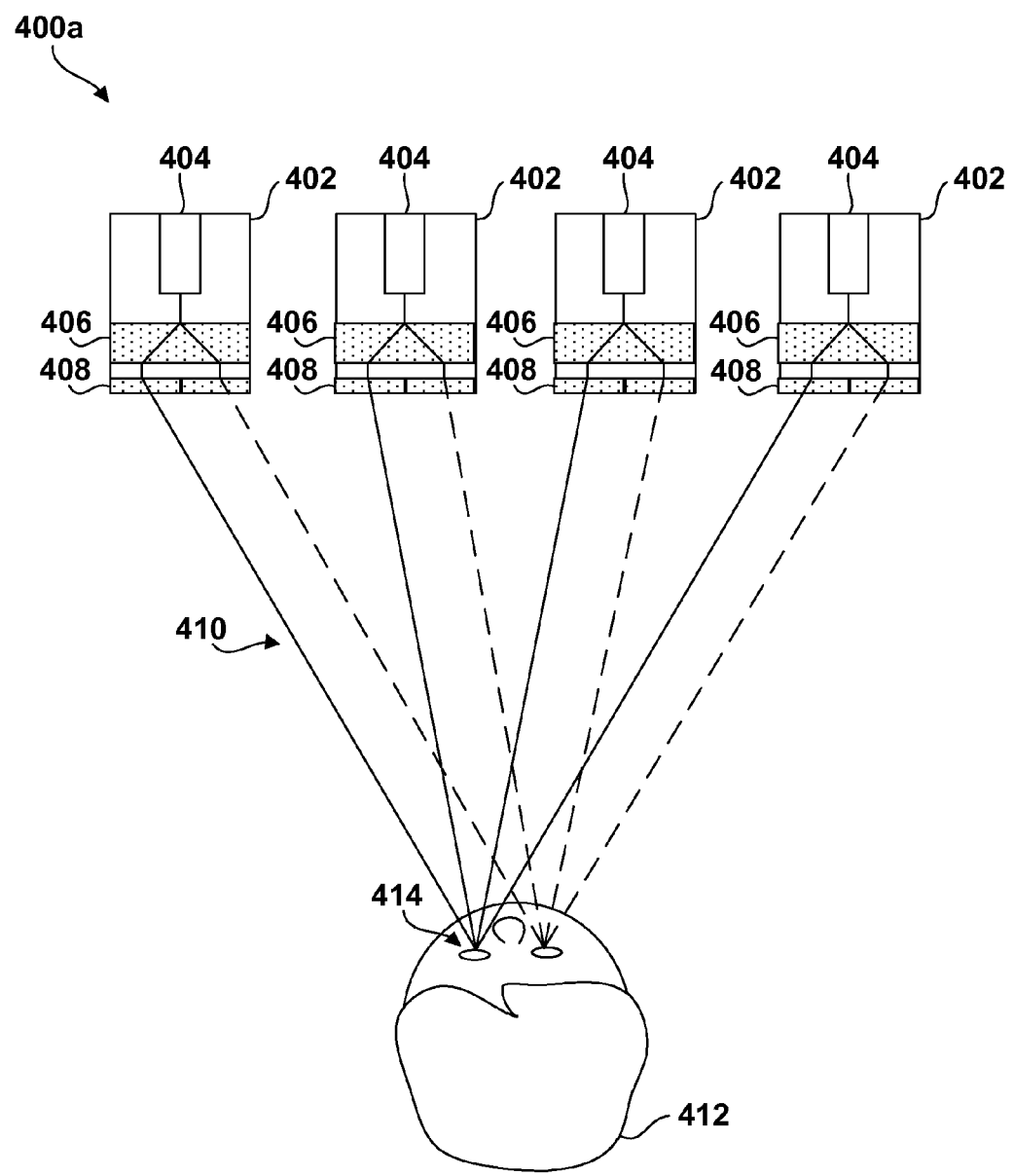
FIG. 4a is a schematic diagram of light rays and controllable lenticular lenslets according to an exemplary embodiment.

Referring to FIG. 4a, a schematic diagram 400a of light rays 410 and electronically controllable lenticular lenslets 408 are shown according to an exemplary embodiment. Pixels 402 include light sources 404, and are depicting as having one controllable lenslet 408 per pixel 402, where each controllable lenslet 408 is capable of steering both a left-eye beam and right-eye beam. Light sources 404 include components necessary for the generation of light corresponding to an image to be displayed. As an example, light sources 404 may include light emitting diodes, liquid crystal components, electroluminescent components, and incandescent light sources, etc. Light sources 404 each generate rays of light which are split into left-eye and right-eye rays (i.e. light rays 410) by beam splitters 406. Beam splitters 406 include components necessary to split a ray of light into at least two separate beams. As an example components may include lenticular components, parallax barriers, lenses, prisms, mirrors, beam-splitters, liquid crystals, electronic ink, baffles, filters, polarizers, and/or waveguides. Beam splitters 406 may include passive or active components. Light rays 410 include left-eye beams (represented by solid lines) and right-eye beams (represented by dashed lines). Lenslets 408 are depicted as steering light rays 410 such that the left-eye and right-eye beams for each pixel 402 reach the left and right eyes 414 of viewer 412, respectively.

Figure 4B:
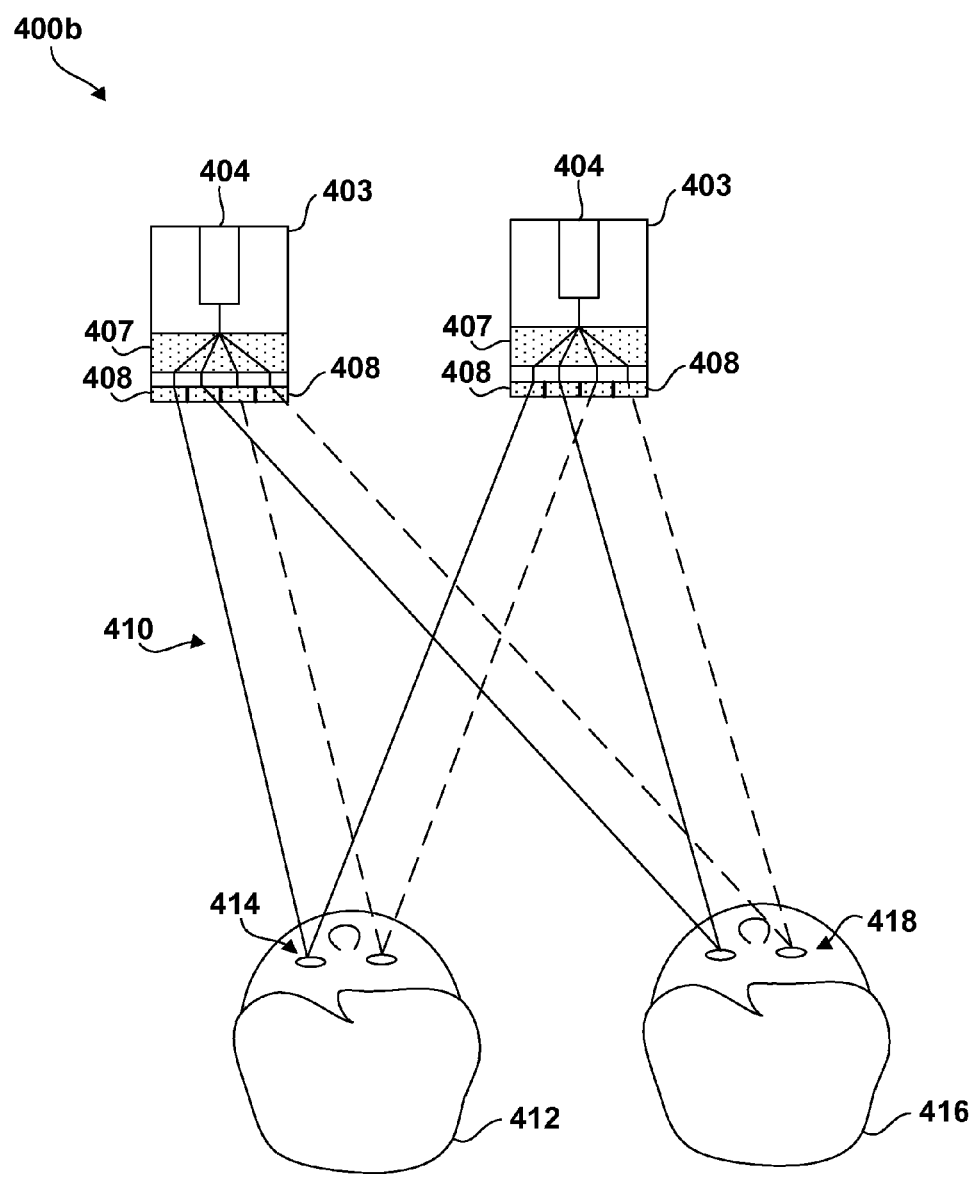
FIG. 4b is a schematic diagram of light rays and controllable lenticular lenslets according to an exemplary embodiment.

Referring to FIG. 4b, a schematic diagram 400b of light rays 410 and electronically controllable lenticular lenslets 408 are shown according to an exemplary embodiment. Pixels 403 include light sources 404, and are depicted as having two controllable lenslets 408 per pixel 403, where a single controllable lenslet 408 is capable of steering both a left-eye beam and right-eye beam. It should be noted that additional configurations of multiple controllable lenslets per pixel are envisioned by the scope of this application. Such arrangements of multiple lenslets per pixel allow for multiple view configurations (e.g., angular multiplexing, time multiplexing, etc.). Light sources 404 include components necessary for the generation of light corresponding to an image to be displayed. As an example, light sources 404 may include light emitting diodes, liquid crystal components, electroluminescent components, and incandescent light sources, etc. Light sources 404 each generate rays of light which are split into left-eye and right-eye rays (i.e. light rays 410) by beam splitters 407. Beam splitters 407 include components necessary to split a ray of light into at least four separate beams. As an example beam splitting components may include lenticular components, parallax barriers, lenses, prisms, mirrors, beam-splitters, liquid crystals, electronic ink, baffles, filters, polarizers, and/or waveguides. Beam splitters 406 may include passive or active components. Light rays 410 include left-eye beams (represented by solid lines) and right-eye beams (represented by dashed lines). By including multiple lenslets 408 per pixel, multiple viewing locations may be generated for multiple viewers. In this manner, viewer 412 and viewer 416 may each have left-eye beams and right-eye beams projected toward their left and right eyes 414 and 418, respectively.

Referring again to FIG. 4a, in an exemplary embodiment, lenslets 408 each include electro-refractive materials. Such electro-refractive material include properties that are optically reactive to electrical signals, and may be formed into beam steering components (e.g., electro-refractive lenses, electro-refractive prisms, evanescent-based electro-optic components, etc.). In an exemplary embodiment, an electric field is applied across an electro-refractive lens, and the refractive index of the lens is adjusted according to the electric field (i.e. per Kerr or Pockels electro-optic effects, etc.). The applied electric field may be controlled by a processing circuit (e.g., processing circuit 300 of FIG. 3). Lenslets 408 includes electro-optic materials configured to steer a left-eye beam and a right-eye beam. This may include, multiple lenses, multiple prisms, etc. Through the application of electric fields to both the left-eye beam and right-eye beam components of lenslets 408, the diffractions angles of left-eye and right-eye beams may be controlled separately, and the left-eye and right-eye beams steered to controlled locations.

In one embodiment, lenslets 408 each include components (e.g., lenses, prisms, microprism arrays, cells, etc.) utilizing an electrowetting effect. This may include electrolyte droplets (e.g., liquid polymers, oils, etc.) that exhibit such an electrowetting effect. By applying an electric field, a solid-to-electrolyte contact angle may be adjusted due to the electrical potential difference between the solid and the electrolyte droplet. The electric field toward the edges of the electrolyte droplet pull the droplet down onto the electrode, lowering the solid-to-electrolyte contact angle and increasing the droplet contact area. In other words, the diffraction angle (i.e. refractive index) of the electrolyte material may be adjusted by controlling the applied electric field. Light rays passing through such electrolyte droplets may then be effectively steered according to the diffraction of the rays passing through the electrolyte material. As discussed herein, the applied electric fields of lenslets 408 may be controlled by a processing circuit (e.g., processing circuit 300 of FIG. 3). Through the application of electric fields to both the left-eye beam and right-eye beam electrolyte components of lenslets 408, the diffractions angles of left-eye and right-eye beams are controlled, and the left-eye and right-eye beams are steered to controlled locations.

In an exemplary embodiment, lenslets 408 each include electro-refractive prisms configured to vary the refraction angle of light rays 410 passing through the prisms. Such prisms may be arranged in an array and have controllable refractive angles. An electric field is applied across the electro-refractive prisms, and left-eye and right-eye beams passing through the prism may be steered to a desired viewing location. Such prisms may steer left-eye and right-eye beams (as provided by beam splitters 406 or 407 as discussed above). In another embodiment, electro-refractive prisms both split and steer a beam of light as provided by light source 404. In such an embodiment, beam splitters 406 may be absent from pixels 402. In an exemplary embodiment, electro-refractive prisms include positive and negative prisms of controllable strengths. In another exemplary embodiment, electro-refractive prisms include biased single-sign prisms of controllable strengths. In another exemplary embodiment, electro-refractive prisms include uniform index prisms (with prismatic shapes). In another exemplary embodiment, electro-refractive prisms include graded index prisms (with uniform shapes). In another exemplary embodiment, electro-refractive prisms include a mix of prisms as described herein (e.g., uniform index prisms and graded index prisms, etc.). A selection of prisms may depend on cost requirements, or pixel configurations of a particular display.

It should be noted, that any of the electro-refractive materials discussed herein may be combined in arrangements with other components. For example, electro-refractive prisms may be paired with non-electro-refractive lenses. In one embodiment, electro-refractive prisms are paired with electro-refractive lenses. Such lenses may be utilized to focus beams passing therethrough.

In an exemplary embodiment, lenslets 408 each include acousto-optical deflectors (as described above) configured to use surface acoustic waves (SAW) to vary the refraction angle (i.e., the angle of emergence) of light rays 410 passing through the optical medium of the deflector. For example, an acousto-optical deflector of a lenslet 408 may adjust the refraction angle by changing the frequency of the acoustic waves generated within the optical medium. The frequency of the acoustic waves may be controlled by a processing circuit (e.g., processing circuit 300 of FIG. 3). A lenslet 408 may include an acousto-optical deflector corresponding to the left-eye beam and an acousto-optical deflector corresponding to the right-eye beam. By adjusting the acoustic waves of the deflectors corresponding to left-eye beam and right-eye beam of lenslets 408, the diffractions angles of each the left-eye and right-eye beams may be controlled and the left-eye and right-eye beams steered to controlled locations. In one embodiment, the acousto-optical deflector of a lenslet 408 uses SAW wavelength ranges selected to corresponding to different colors of light being generated. In this manner, light produced by red, green, and blue, etc., sub-pixels of a pixel may be diffractively steered. Acousto-optical deflectors may be used in a lenslet 408 in any manner as discussed herein for electro-refractive based components.

Figure 5:
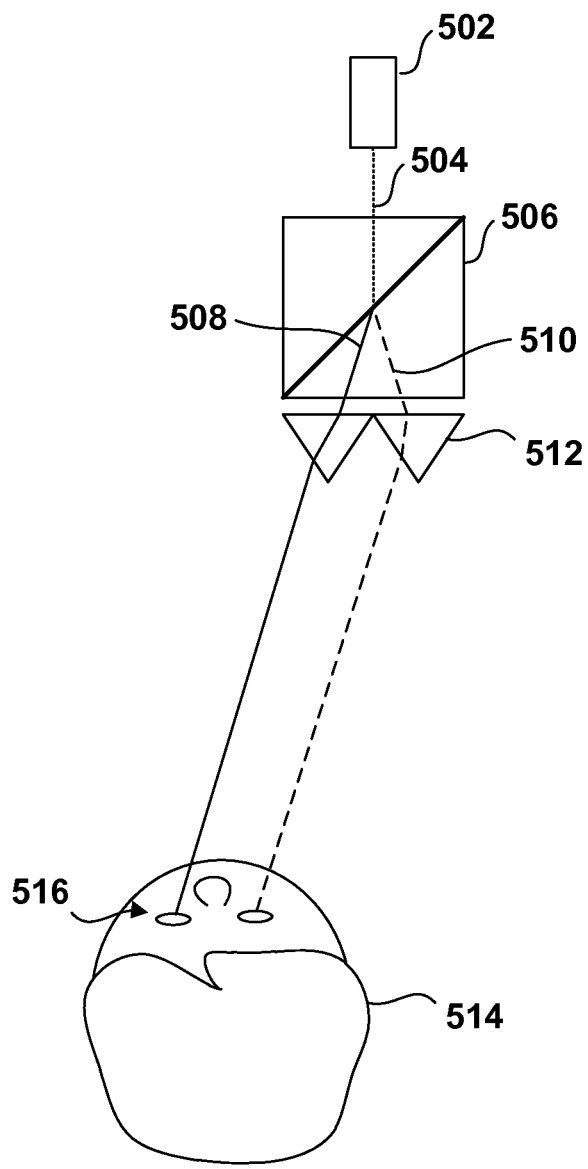
FIG. 5 is a schematic diagram of light rays and controllable lenticular lenslets according to an exemplary embodiment.

Referring to FIG. 5, a schematic diagram of controllable lenslet 512 is shown according to an exemplary embodiment. Light source 502 generates a light beam corresponding to a pixel. Light source 502 may be a light source as described herein or otherwise (e.g., light emitting diodes, liquid crystal component, electroluminescent components, and incandescent light sources, etc.). Light ray 504 passes through beam splitter 506 configured to split a ray of light into two beams of light (left-eye beam 508 and right-eye beam 510). Beam splitter 506 may include passive or active components, or a combination of passive and active components. Left-eye beam 508 and right-eye beam 510 pass through controllable lenslet 512, which steers each beam towards a controlled location (e.g., a viewing location, the eyes 516 of viewer 514, etc.). Lenslet 512 is shown as including electro-refractive prisms for both the left-eye beam and right-eye beam. Such electro-refractive prisms steer light beams through the adjustment of their refraction angles, which may be controlled according to the electric field applied. Although FIG. 5 depicts lenslet 512 as including electro-refractive prisms, in other embodiments, lenslet 512 may utilize acousto-optical deflectors or other electro-refractive materials as discussed herein. In one embodiment, lenslet 512 includes non-electro-refractive lenses configured to focus the beams of light leaving the electro-refractive components.

Figure 6:
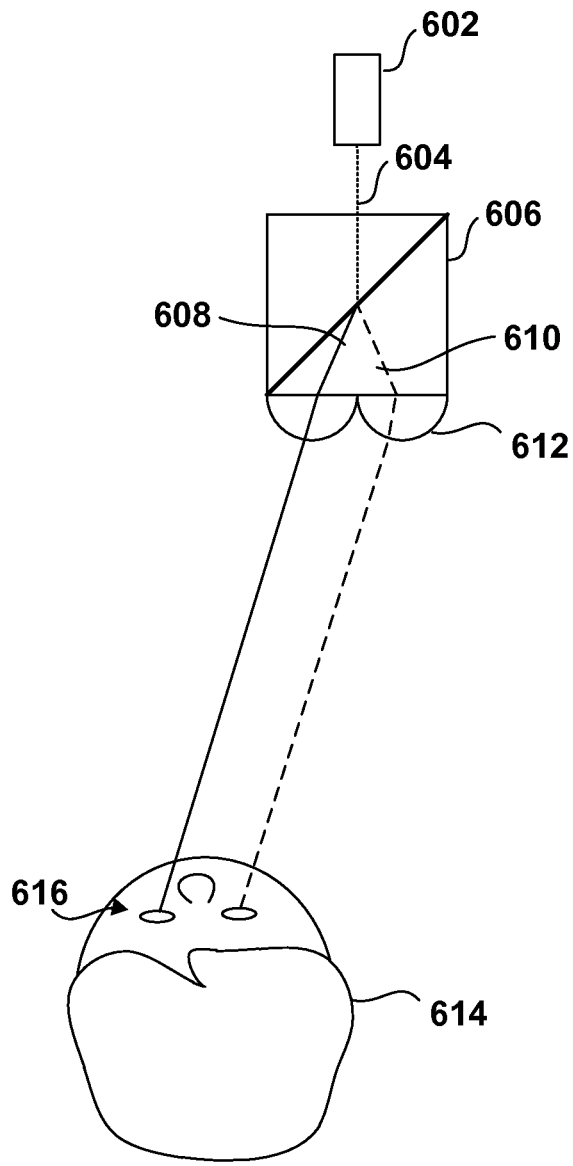
FIG. 6 is a schematic diagram of light rays and controllable lenticular lenslets according to an exemplary embodiment.

Referring to FIG. 6, a schematic diagram of controllable lenslet 612 is shown according to an exemplary embodiment. Light source 602 generates a light beam corresponding to a pixel. Light source 602 may be a light source as described herein or otherwise (e.g., light emitting diodes, liquid crystal component, electroluminescent components, and incandescent light sources, etc.). Light ray 604 passes through beam splitter 606 configured to split a ray of light into two beams of light (left-eye beam 608 and right-eye beam 610). Beam splitter 606 may include passive or active components, or a combination of passive and active components. Left-eye beam 608 and right-eye beam 610 pass through controllable lenslet 612, which steers each beam towards a controlled location (e.g., a viewing location, the eyes 616 of viewer 614, etc.). Lenslet 612 is shown as including electro-refractive lenses for both the left-eye beam and right-eye beam. Such electro-refractive lenses steer light beams through the adjustment of their refraction angles, which may be controlled according to the electric field applied. Although FIG. 6 depicts lenslet 612 as including electro-refractive prisms or arrays of prisms, in other embodiments, lenslet 612 may utilize acousto-optical deflectors or other electro-refractive materials as discussed herein.

Figure 7A:
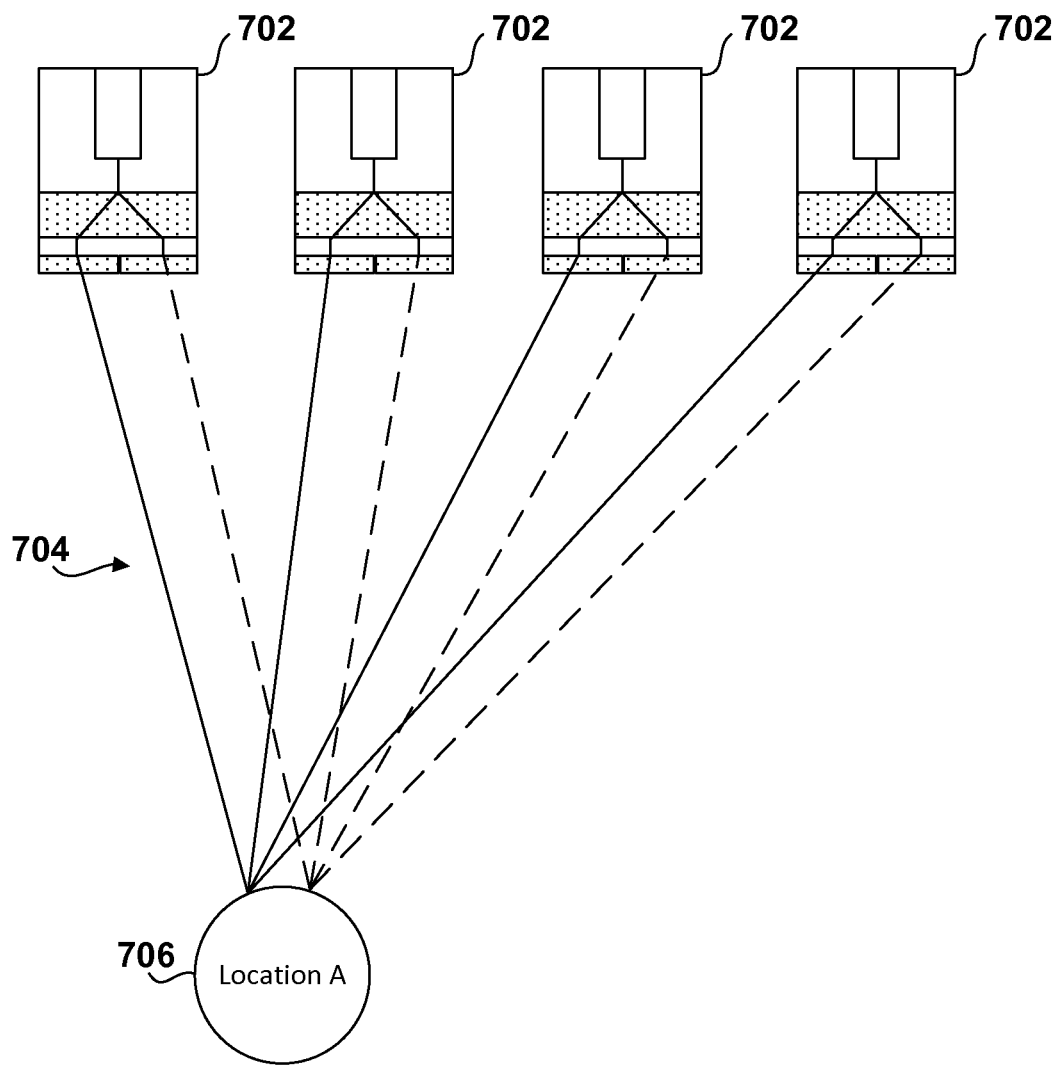
FIG. 7a is a schematic diagram of light rays and controllable lenticular lenslets according to an exemplary embodiment.
Figure 7B:
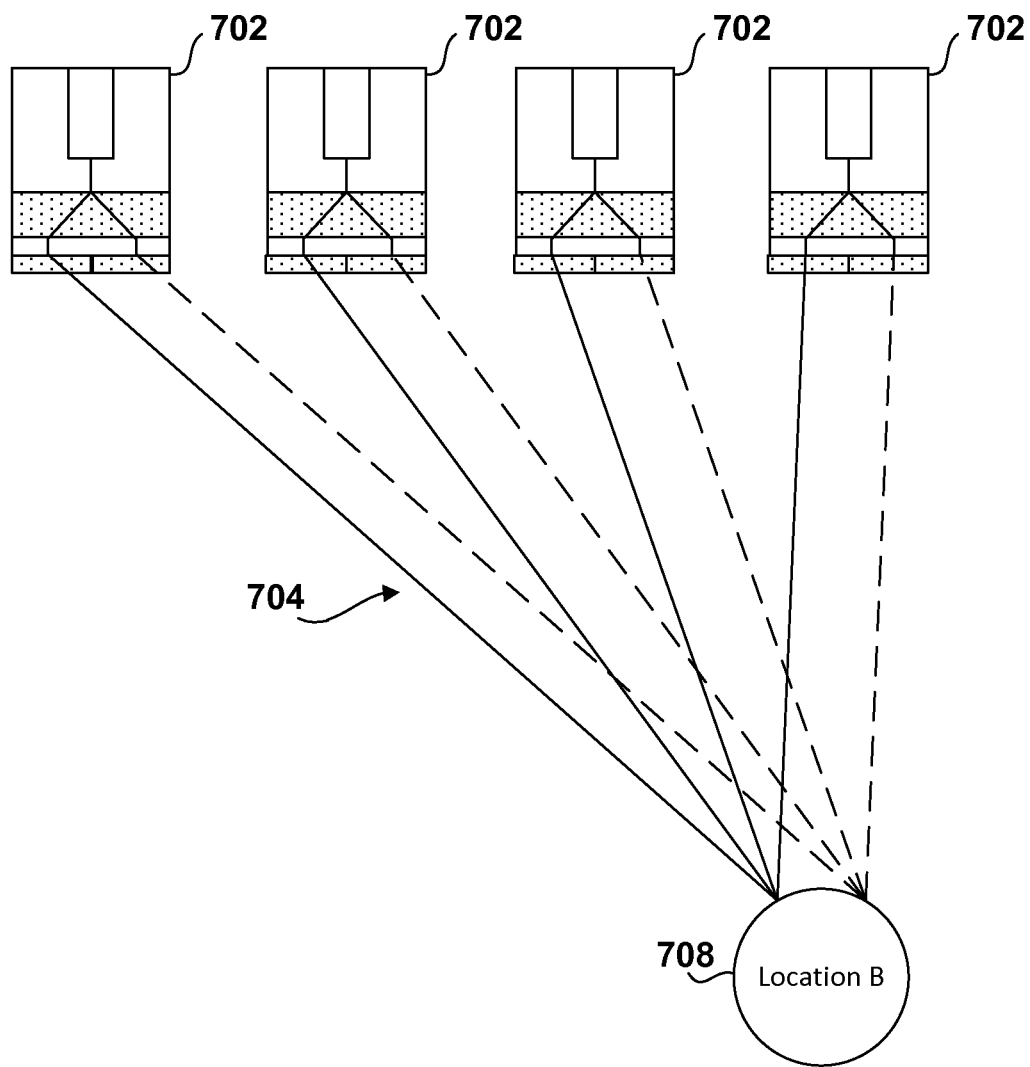
FIG. 7b is a schematic diagram of light rays and controllable lenticular lenslets according to an exemplary embodiment.

Referring to FIGS. 7a and 7b, light rays 704 are shown corresponding to exemplary embodiments in use. FIG. 7a shows light rays 704 as generated by pixels 702 in order to generate a first viewing location 706. Pixels 702 includes controllable lenslets as described herein (e.g., lenslets 408 of FIG. 4a, etc.) and may be part of an autostereoscopic display. Viewing location 706 may correspond to an ideal location in which a viewer should view an autostereoscopic display. FIG. 7b shows light rays 704 as generated by pixels 702 in order to generate a second viewing location 708. Viewing location 708 is depicted as being laterally transposed from viewing location 706. The lateral location of a viewing location may be varied by adjusting the steering angle corresponding to left-eye beams and right-eye beams by the same angular amount. For example, at first viewing location 706, the left-eye beam and right-eye beam of a pixel 802 may each be steered by a controllable lenslet to project from the display at −5 degrees off a center-axis. At second viewing location 708, the left-eye beam and right-eye beam of a pixel 802 may each be steered by the controllable lenslet to project from the display at +5 degrees off the center-axis. By applying similar shifts to the pixels corresponding to a view, viewing location 706 may be laterally shifted to the position depicted by viewing location 708. A processing circuit (e.g., processing circuit 300 of FIG. 3) may control and calculate the appropriate angular amounts required to laterally adjust a viewing location.

Figure 8A:
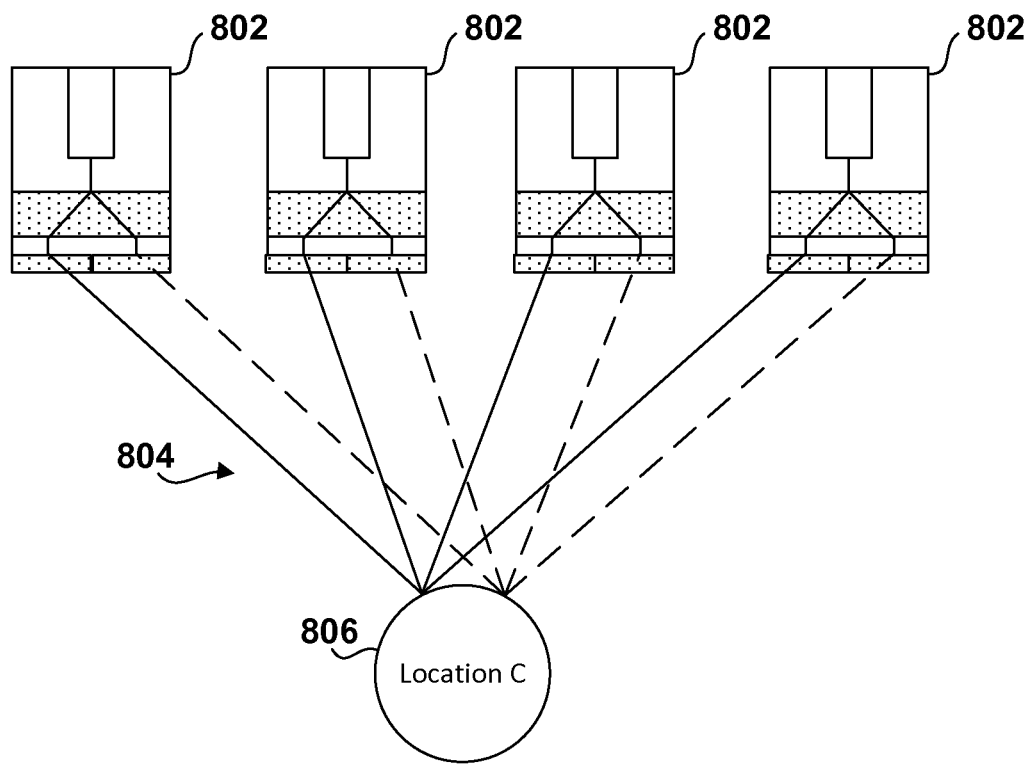
FIG. 8a is a schematic diagram of light rays and controllable lenticular lenslets according to an exemplary embodiment.
Figure 8B:
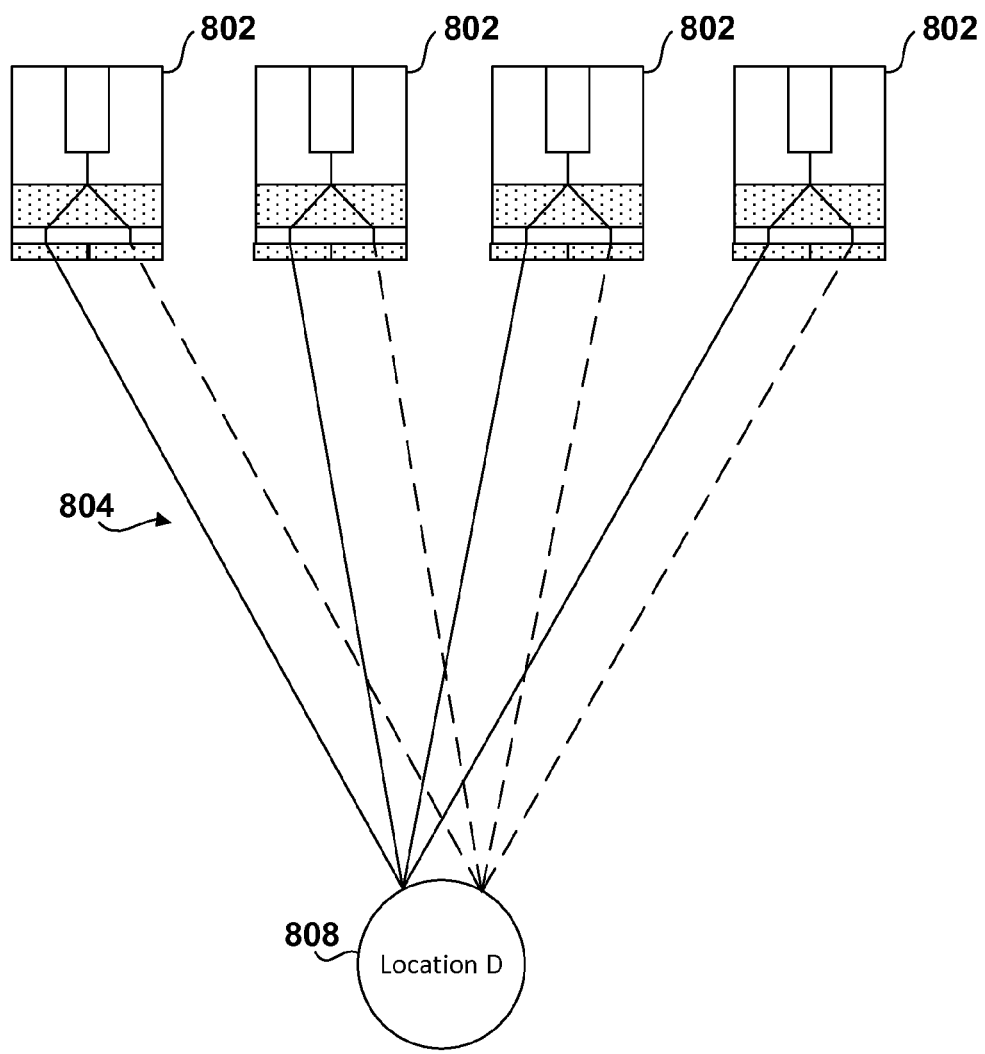
FIG. 8b is a schematic diagram of light rays and controllable lenticular lenslets according to an exemplary embodiment.

Referring to FIGS. 8a and 8b, light rays 804 are shown corresponding to exemplary embodiments in use. FIG. 8a shows light rays 804 as generated by pixels 802 in order to generate a first viewing location 806. Pixels 802 includes controllable lenslets as described herein (e.g., lenslets 408 of FIG. 4a, etc.) and may be part of an autostereoscopic display. Viewing location 806 may correspond to an ideal location in which a viewer should view an autostereoscopic display. FIG. 8b shows light rays 804 as generated by pixels 802 in order to generate a second viewing location 808. Viewing location 808 is depicted as being transposed in range from viewing location 806. The range of a viewing location may be varied by adjusting the steering angle corresponding to left-eye beams and right-eye beams by different (e.g. opposite) angular amounts. For example, at first viewing location 806, the left-eye beam of a pixel 802 may be steered by a controllable lenslet to project at −5 degrees off a center-axis, and the right-eye beam of a pixel 802 may be steered by the controllable lenslet to project at +5 degrees off the center-axis. At second viewing location 808, the left-eye beam of a pixel 802 may be steered by the controllable lenslet to project at −10 degrees off a center-axis, and the right-eye beam of a pixel 802 may be steered by the controllable lenslet to project at +10 degrees off the center-axis. By applying similar shifts to the pixels corresponding to a view, viewing location 806 may be shifted in range to the position depicted by viewing location 808. A processing circuit (e.g., processing circuit 300 of FIG. 3) may control and calculate the appropriate angular amounts required to adjust the range of a viewing location.

Such lateral and range shifts in a viewing location may correspond to a variety of embodiments. Lateral and range shifts in a viewing location may occur at the same time or separately. Multiple viewing locations may also be varied at the same time, or separately. Lateral and range shifts may also vary to correspond to different pixel locations across the surface of the display in order to deliver a global ideal viewing location. In one embodiment, a viewing location is varied statically. For example, the viewing location may be based on a preset option provided by the display (e.g., range locations may be 8 feet, 10 feet, 12 feet from the center of the display, etc., and lateral locations may be −5 degrees, 0 degrees, and +5 degrees from a center axis, etc.). In another embodiment, the viewing location corresponds to a viewer saved setting. In another embodiment, multiple viewers each have their own viewing location. In another embodiment, a viewing location shifts in response to a viewer command.

In an exemplary embodiment, a viewing location is varied dynamically. For example, the viewing location may be based on the detected location of a viewer, and may shift to track the viewer as the viewer moves. Viewer tracking may be implemented utilizing a viewer tracking system as described herein (e.g., viewer tracking system 208 of FIG. 2). In one embodiment, a viewer is tracked utilizing cameras. In another embodiment, a viewer is tracked utilizing a tracking beacon worn or otherwise carried by the viewer. In another embodiment, a viewer is tracked using radar sensors. A processing circuit (e.g., processing circuit 300 of FIG. 3) receives data corresponding to the location of a viewer, and adjusts a viewing location generated by the lenslets of pixels 802 according to the viewer location data. A viewing location may also be adjusted in real time in response to a moving viewer, or according to a schedule (e.g., every 2 seconds, every 5 seconds, etc.), or otherwise.

Figure 9:
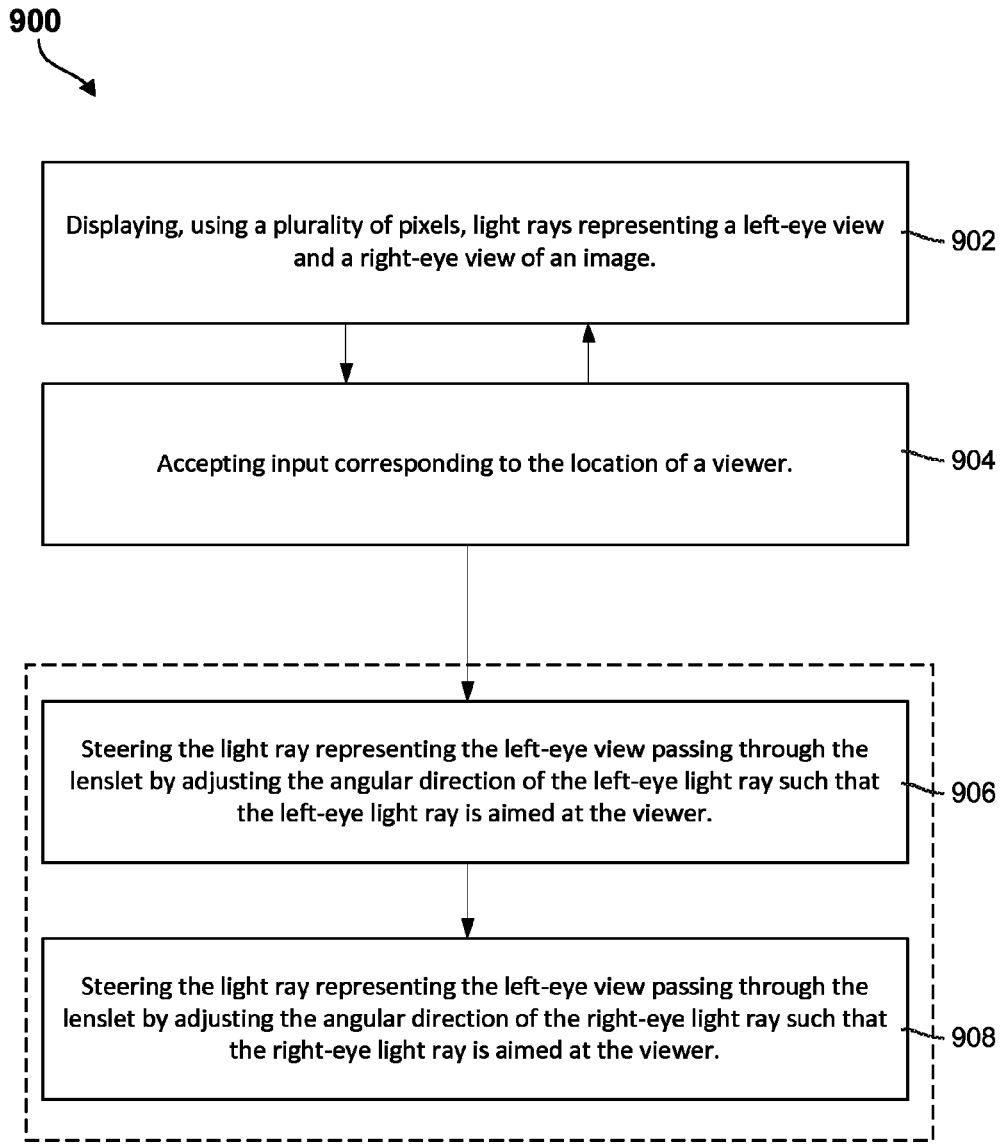
FIG. 9 is a flowchart of a process for using controllable lenticular lenslets according to an exemplary embodiment.

Referring to FIG. 9, a flow diagram of a process 900 for using controllable lenticular lenslets is shown, according to an exemplary embodiment. In alternative embodiments, fewer, additional, and/or different steps may be performed. Also, the use of a flow diagram is not meant to be limiting with respect to the order of steps performed. Process 900 includes displaying, using a plurality of pixels, light rays representing a left-eye view and a right-eye view of an image (step 902), accepting input corresponding to the location of a viewer (step 904), steering the light ray representing the left-eye view passing through the lenslet by adjusting the angular direction of the left-eye light ray such that the left-eye light ray is aimed at the viewer (step 906), and steering the light ray representing the left-eye view passing through the lenslet by adjusting the angular direction of the right-eye light ray such that the right-eye light ray is aimed at the viewer (step 908).

Figure 10:
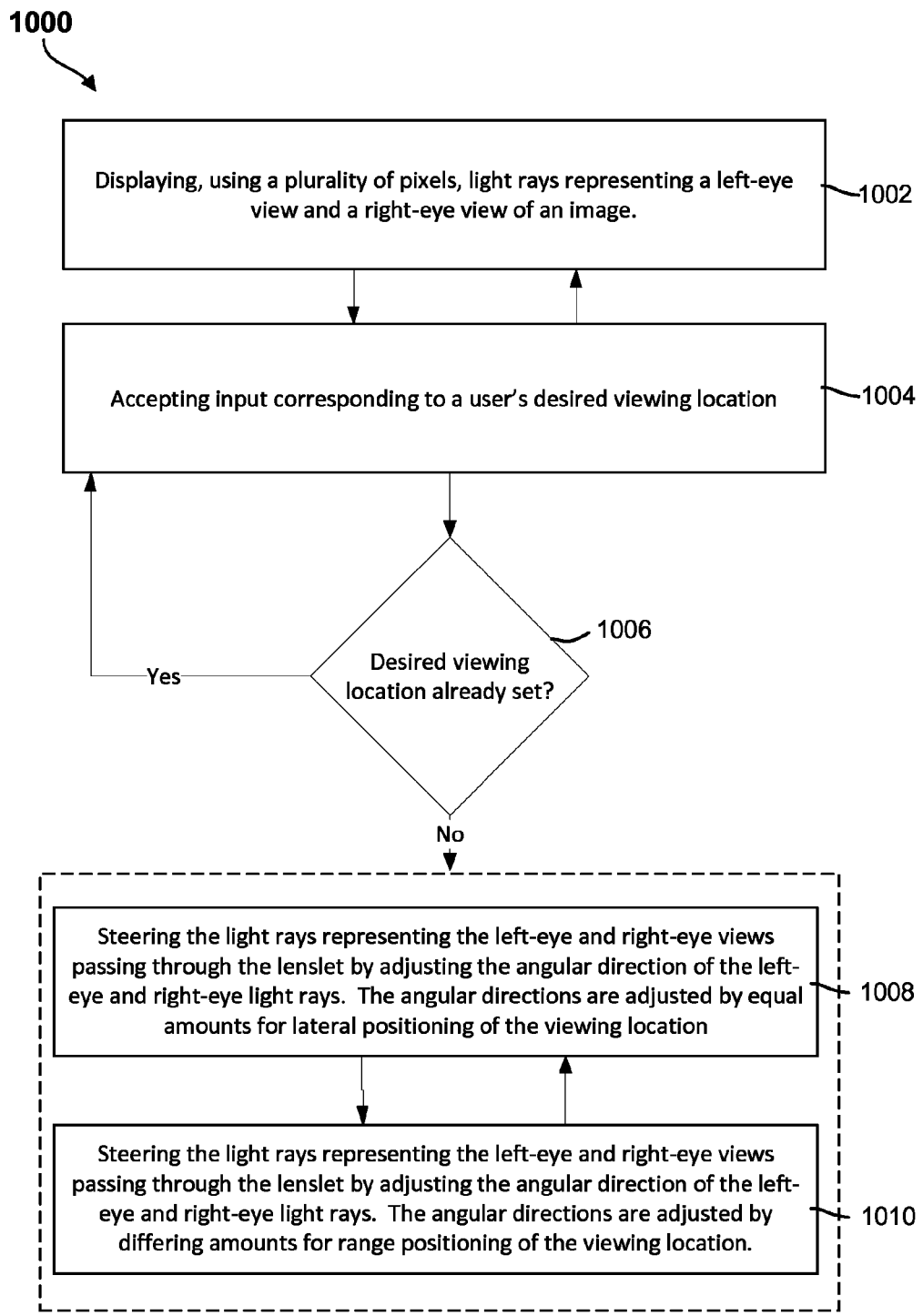
FIG. 10 is a flowchart of a process for using controllable lenticular lenslets to alter a viewing location according to an exemplary embodiment.

Referring to FIG. 10, a flow diagram of a process 1000 for using controllable lenticular lenslets is shown, according to an exemplary embodiment. In alternative embodiments, fewer, additional, and/or different steps may be performed. Also, the use of a flow diagram is not meant to be limiting with respect to the order of steps performed. Process 1000 includes displaying, using a plurality of pixels, light rays representing a left-eye view and a right-eye view of an image (step 1002), and accepting input corresponding to a user's desired viewing location (step 1004). If a viewer's desired viewing location is already set (step 1006), then input corresponding to a user's desired viewing location continues to be accepted (step 1004) (i.e. wait for an updated desired location). If a viewer's desired viewing location is not already set (step 1006), then the light rays representing the left-eye and right-eye views passing through the lenslet are steered by adjusting the angular directions of the left-eye and right-eye light rays (steps 1008 and 1010). The angular directions are adjusted by equal amounts for lateral positioning of the viewing location, and the angular directions are adjusted by differing amounts for range positioning of the viewing location (steps 1008 and 1010). Any combination of adjustments to the angular directions may be used to steer the left-eye and right-eye light rays.

Figure 11:
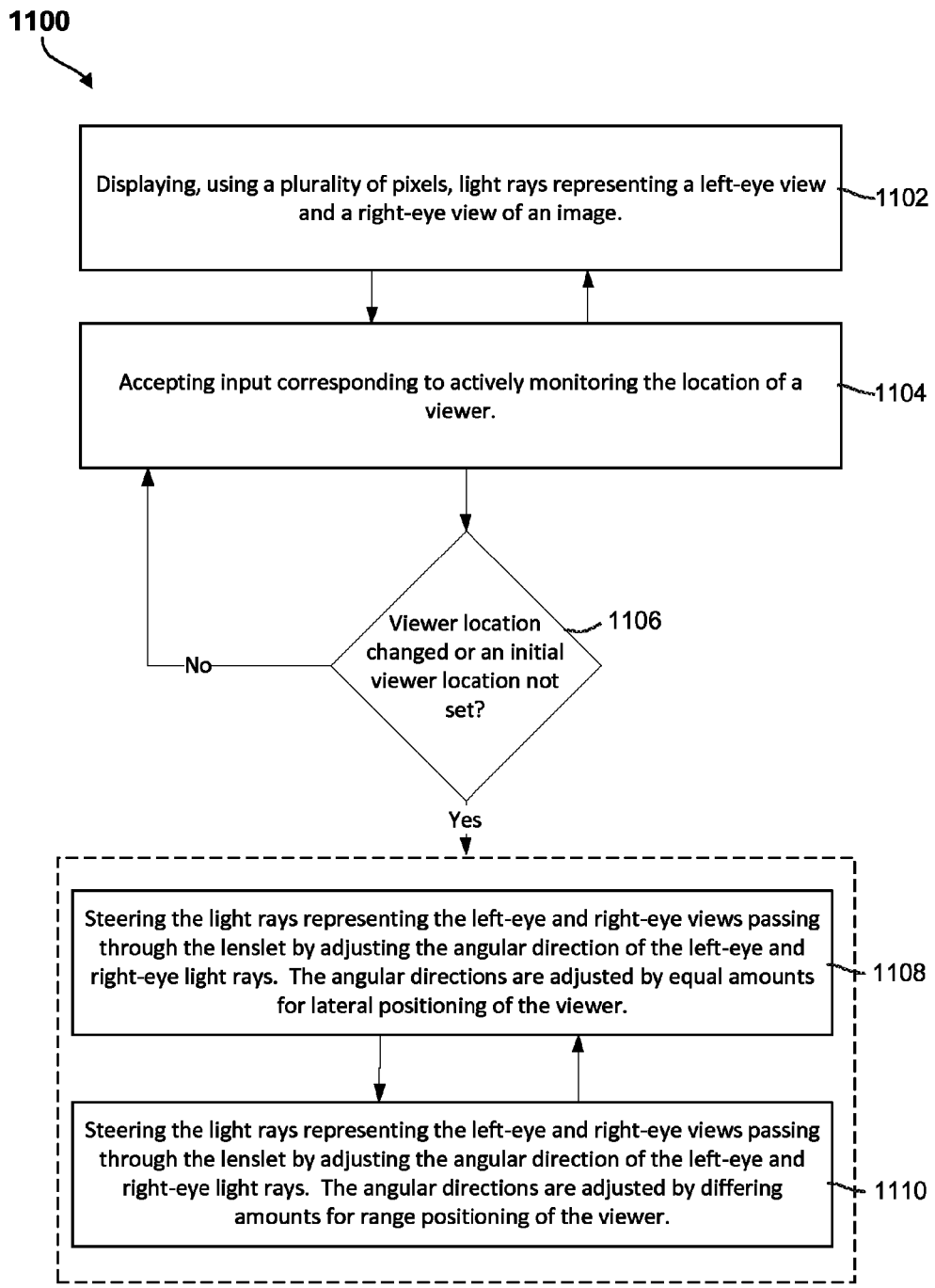
FIG. 11 is a flowchart of a process for using controllable lenticular lenslets to alter a viewing location according to an exemplary embodiment.

Referring to FIG. 11, a flow diagram of a process 1100 for using controllable lenticular lenslets is shown, according to an exemplary embodiment. In alternative embodiments, fewer, additional, and/or different steps may be performed. Also, the use of a flow diagram is not meant to be limiting with respect to the order of steps performed. Process 1100 includes displaying, using a plurality of pixels, light rays representing a left-eye view and a right-eye view of an image (step 1102), and accepting input corresponding to actively monitoring the location of a viewer (step 1104). If the viewer's location has changed or an initial viewer location has not been set (step 1106), then the light rays representing the left-eye and right-eye views passing through the lenslet are steered by adjusting the angular direction of the left-eye and right-eye light rays (steps 1108 and 1110). The angular directions are adjusted by equal amounts for lateral positioning of the viewer, and the angular directions are adjusted by differing amounts for range positioning of the viewer (steps 1108 and 1110). Any combination of adjustments to the angular directions may be used to steer the left-eye and right-eye light rays.

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

Although the figures may show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule-based logic and other logic to accomplish the various connection steps, processing steps, comparison steps and decision steps.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An autostereoscopic 3D display system, comprising:
   a display comprising a plurality of pixels, wherein each pixel is configured to display light rays representing a left-eye view and a right-eye view of an image; and
   for each pixel:
      a beam splitter configured to split a ray of light into the light rays representing the left-eye view and the right-eye view; and
      a separately controllable lenslet configured to:
         steer the light ray representing the left-eye view in a first angular direction by a first amount; and
         steer the light ray representing the right-eye view in the first angular direction by a second amount different from the first amount.

2. The autostereoscopic 3D display system of claim 1, wherein the lenslet comprises an electro-refractive element configured to adjust an angular direction of the light ray passing therethrough.

3. The autostereoscopic 3D display system of claim 2, wherein the electro-refractive element includes a uniform index prism.

4. The autostereoscopic 3D display system of claim 2, wherein the electro-refractive element includes a graded index prism.

5. The autostereoscopic 3D display system of claim 2, wherein the electro-refractive element includes a lens having a controllable strength.

6. The autostereoscopic 3D display system of claim 2, wherein the electro-refractive element includes an electro-refractive prism and a lens, and wherein the electro-refractive prism and the lens are together configured to adjust the angular direction of the light ray.

7. The autostereoscopic 3D display system of claim 1, further comprising a processing circuit configured to control each lenslet by generating signals to:
   adjust the angular direction of the light ray representing the left-eye view passing through each lenslet; and
   adjust the angular direction of the light ray representing the right-eye view passing through each lenslet.

8. The autostereoscopic 3D display system of claim 7, wherein the adjustment to the angular directions of the light rays laterally varies an ideal viewing location.

9. The autostereoscopic 3D display system of claim 7, wherein the processing circuit is further configured to adjust angular directions of light rays corresponding to a group of pixels.

10. The autostereoscopic 3D display system of claim 9, wherein the adjustment to the angular directions of the light rays corresponding to the group of pixels varies an ideal viewing location.

11. The autostereoscopic 3D display system of claim 10, wherein the ideal viewing location is based on a preset option.

12. The autostereoscopic 3D display system of claim 10, wherein the ideal viewing location is varied in response to a viewer command.

13. The autostereoscopic 3D display system of claim 10, wherein the ideal viewing location is varied statically.

14. The autostereoscopic 3D display system of claim 10, wherein the ideal viewing location is varied dynamically.

15. A non-transitory computer-readable medium having instructions stored thereon for execution by a processing circuit of an autostereoscopic 3D display system, the instructions comprising:
   instructions for controlling a plurality of pixels configured to display light rays representing a left-eye view and a right-eye view of an image, wherein each pixel of the plurality of pixels includes a beam splitter configured to split a ray of light into the light rays representing the left-eye view and the right-eye view; and
   instructions for controlling a separately controllable lenslet for each pixel, wherein the lenslet is configured to:
      steer the light ray representing the left-eye view in a first angular direction by a first amount; and
      steer the light ray representing the right-eye view in the first angular direction by a second amount different from the first amount.

16. The non-transitory computer-readable medium of claim 15, wherein the lenslet comprises an electro-refractive element configured to adjust an angular direction of a light ray passing therethrough.

17. The non-transitory computer-readable medium of claim 16, further comprising a processing circuit configured to control each lenslet by generating signals to:
   instructions for adjusting the angular direction of the light ray representing the left-eye view passing through the lenslet; and
   instructions for adjusting the angular direction of the light ray representing the right-eye view passing through the lenslet.

18. The non-transitory computer-readable medium of claim 17, further comprising instructions for adjusting angular directions of light rays corresponding to a group of pixels.

19. The non-transitory computer-readable medium of claim 18, wherein the adjustment to the angular directions of the light rays corresponding to the group of pixels varies an ideal viewing location.

20. The non-transitory computer-readable medium of claim 19, wherein the ideal viewing location is controlled to correspond with a tracked location of at least one viewer.

21. The non-transitory computer-readable medium claim 19, further comprising instructions for generating an identifier configured to assist a viewer in finding the ideal viewing location.

22. The non-transitory computer-readable medium of claim 21, wherein the identifier includes a light beam projected at the ideal viewing location.

23. The non-transitory computer-readable medium of claim 21, wherein the identifier includes range and angle information of the ideal viewing location shown on the display.

24. A method for controlling an autostereoscopic 3D display, comprising:
- displaying, by using a plurality of pixels, light rays representing a left-eye view and a right-eye view of an image, wherein each pixel of the plurality of pixels includes a beam splitter configured to split a ray of light into the light rays representing the left-eye view and the right-eye view; and
- controlling the light rays representing the left-eye view and the right-eye view by using at least one separately controllable lenslet per pixel, wherein the lenslet is configured to:
  - steer the light ray representing the left-eye view in a first angular direction by a first amount; and
  - steer the light ray representing the right-eye view in the first angular direction by a second amount different from the first amount.

25. The method of claim 24, further comprising:
- adjusting the angular direction of the light ray representing the left-eye view passing through the lenslet; and
- adjusting the angular direction of the light ray representing the right-eye view passing through the lenslet.

26. The method of claim 25, further comprising adjusting angular directions of light rays corresponding to a group of pixels.

27. The method of claim 26, wherein the adjustment to the angular directions of the light rays corresponding to the group of pixels varies an ideal viewing location.

28. The method of claim 27, wherein the ideal viewing location corresponds with a tracked location of a viewer.

29. The method of claim 28, further comprising tracking the viewer and updating the ideal location based on viewer movement.

30. The method of claim 29, wherein tracking the viewer includes using at least one of a camera, an ultrasonic component, and a radar component.

31. The method of claim 25, wherein each pixel comprises a stereoscopic component configured to split a light ray into the light rays representing a left-eye view and a right-eye view of an image.

32. The method of claim 31, wherein the stereoscopic component includes at least one of a lenticular lenslet and a lenticular barrier.

33. The method of claim 31, wherein the lenslet comprises an acousto-optic element configured to generate a surface acoustic wave to adjust an angular direction of a light ray passing therethrough, and wherein a wavelength of the surface acoustic wave corresponds to a color of the light ray passing therethrough.

34. The method of claim 33, wherein the wavelength corresponding to the color are different than a wavelength corresponding to another color.

* * * * *